United States Patent
Wu et al.

(10) Patent No.: US 10,274,778 B2
(45) Date of Patent: Apr. 30, 2019

(54) COLOR FILTER PLATE AND FABRICATION METHOD THEREOF

(71) Applicants: Xiamen Tianma Micro-electronics Co., Ltd., Xiamen (CN); Tianma Micro-electronics Co., Ltd., Shenzhen (CN)

(72) Inventors: Shumao Wu, Xiamen (CN); Xiufeng Zhou, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/985,307

(22) Filed: Dec. 30, 2015

(65) Prior Publication Data

US 2016/0259206 A1    Sep. 8, 2016

(30) Foreign Application Priority Data

Mar. 3, 2015    (CN) .......................... 2015 1 0093894

(51) Int. Cl.
*G02F 1/1335* (2006.01)
*G02B 5/20* (2006.01)

(52) U.S. Cl.
CPC ....... *G02F 1/133516* (2013.01); *G02B 5/201* (2013.01); *G02F 1/133512* (2013.01); *G02F 1/133514* (2013.01)

(58) Field of Classification Search
CPC .......................... G02F 1/133514; G02B 5/201
USPC ........................... 349/106, 108, 155; 359/891
See application file for complete search history.

(56) References Cited

U.S. PATENT DOCUMENTS

| | | | | |
|---|---|---|---|---|
| 5,617,230 A | * | 4/1997 | Ohgawara | G02F 1/133512 349/108 |
| 5,948,577 A | * | 9/1999 | Nakazawa | B41M 3/003 349/106 |
| 8,400,606 B2 | * | 3/2013 | Song | G02F 1/13394 349/106 |
| 8,520,062 B2 | * | 8/2013 | Kim | H01J 9/00 348/51 |
| 8,659,723 B2 | * | 2/2014 | Park | G02F 1/133514 349/106 |
| 8,969,904 B2 | * | 3/2015 | Chao | H01L 51/0024 257/40 |
| 9,025,112 B2 | * | 5/2015 | Xu | G02F 1/133512 349/106 |

(Continued)

FOREIGN PATENT DOCUMENTS

CN    1410815 A    4/2003
CN    1460879 A    12/2003

(Continued)

*Primary Examiner* — Audrey Y Chang
(74) *Attorney, Agent, or Firm* — Anova Law Group, PLLC

(57) ABSTRACT

A color filter plate, a color filter plate fabrication method and a display panel are provided. The color filter plate comprises a substrate and a plurality of color filter elements alternately arranged on the substrate. Each color filter element includes two edge portions and one body portion between the two edge portions. The plurality of color filter elements further comprises a plurality of first color filter elements, and at least one edge portion of each first color filter element is thicker than the body portion of each first color filter element.

8 Claims, 12 Drawing Sheets

(56) References Cited

U.S. PATENT DOCUMENTS

| | | | |
|---|---|---|---|
| 9,103,982 B2 * | 8/2015 | Su | H05B 33/10 |
| 2006/0158599 A1 * | 7/2006 | Koo | G02F 1/133514 |
| | | | 349/155 |

FOREIGN PATENT DOCUMENTS

| | | | |
|---|---|---|---|
| CN | 1967337 | A | 5/2007 |
| CN | 1991497 | A | 7/2007 |
| CN | 103941462 | A | 7/2014 |
| JP | 2005181675 | A | 7/2005 |
| KR | 101070796 | B1 | 10/2011 |
| TW | 201426467 | A | 7/2014 |

* cited by examiner

COLOR FILTER PLATE AND FABRICATION METHOD THEREOF

CROSS-REFERENCES TO RELATED APPLICATIONS

This application claims the priority of Chinese patent application No. CN201510093894.8, filed on Mar. 3, 2015, the entire content of which is incorporated herein by reference.

FIELD OF THE DISCLOSURE

The present disclosure relates to the field of display technology and, more particularly, relates to a color filter plate and fabrication techniques thereof, a color film substrate and corresponding display devices.

BACKGROUND

Liquid crystal display (LCD) is a display device utilizing liquid crystal materials. It has advantages such as lightweight, low power consumption, mass information and etc. LCD panel is the most important component of LCD, while color filter plate is further an essential part of the LCD panel.

FIG. 1 illustrates a cross-sectional view of a conventional LCD panel. As shown in FIG. 1, the conventional LCD panel usually includes an array substrate 101, an opposite color film substrate 102, and a liquid crystal layer 103 disposed between the array substrate 101 and the color film substrate 102. The array substrate 101 further includes a plurality of pixels 104, which are separated by data lines and scanning lines made of opaque metal wires. Each pixel 104 includes a light transmitting region and a light shielding region in addition to the light transmitting region. The color film substrate 102 further includes a color filter plate 100 having a plurality of green color filter elements 105a, a plurality of red color filter elements 105b and a plurality of blue color filter elements 105c.

The plurality of green color filter elements 105a, the plurality of red color filter elements 105b and the plurality of blue color filter elements 105c have a uniform thickness and are one-to-one corresponding to the light transmitting regions of the plurality of pixels 104. In addition, a black matrix 106 is disposed among the adjacent color filter elements, which corresponds to the light shielding regions of the plurality of pixels 104. The black matrix 106 also overlaps the data lines or the scanning lines on the array substrate 101.

In LCD panel fabrication processes, the prepared array substrate 101 and the prepared color film substrate 102 are aligned and attached to each other. If there is an alignment mismatch (i.e. misalignment) between the array substrate 101 and the color film substrate 102, a misalignment between the color filter elements on the color film substrate 102 and the light transmitting regions in the pixels 104 usually occurs. As a result, light transmitted through the liquid crystal layer 103 generates a color mixing in regions among the color filter elements of different colors, i.e. a color shift. Especially, when there is a certain angle between an observer and a normal direction of the LCD panel (i.e. the LCD panel is watched at an off-angle), an obvious color shift, i.e., a large viewing angle color shift, is observed and the display performance is degraded.

Due to higher and higher demands for high resolution LCDs, the green color filter elements 105a, the red color filter elements 105b and the blue color filter elements 105c become smaller and smaller. As a result, the color shift caused by the misalignment between the array substrate 101 and the color film substrate 102 become more and more severe, which accordingly degrades the display performance.

One solution is to increase the black matrix 106 width to reduce color shift. However, with such approach, the aperture ratio of the LCD panel and the light transmittance can also be reduced, which also degrades the display performance. The disclosed color filter plate and fabrication method thereof are directed to solve one or more problems in the art.

BRIEF SUMMARY OF THE DISCLOSURE

One aspect of the present disclosure provides a color filter plate. The color filter plate comprises a substrate and a plurality of color filter elements alternately arranged on the substrate. Each color filter element includes two edge portions and one body portion between the two edge portions. The plurality of color filter elements further comprises a plurality of first color filter elements, and at least one edge portion of each first color filter element is thicker than the body portion of each first color filter element.

Another aspect of the present disclosure provides a display device. The display device comprises an array substrate, a color filter plate and spacers between the color film substrate and the array substrate. The color filter plate further comprises a substrate and a plurality of color filter elements alternately arranged on the substrate. Each color filter element includes two edge portions and one body portion between the two edge portions. The plurality of color filter elements further comprises a plurality of first color filter elements, and at least one edge portion of each first color filter element is thicker than the body portion of each first color filter element.

Another aspect of the present disclosure a color filter plate fabrication method. The color filter plate fabrication method comprises forming a black matrix on a substrate through a patterning process, coating and curing a first color layer on a substrate, exposing the first color layer through a first photomask and developing the first color layer to form a plurality of first color filter elements having two edge portions and one body portion between the two edge portions. The first photomask has a plurality of opaque regions, a plurality of transparent regions and a plurality of partially transparent regions. The edge portion of the first color filter element is thicker than the body portion of the first color filter element, and the partially transparent region of the first photomask corresponds to the body portion of the first color filter element.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 2:
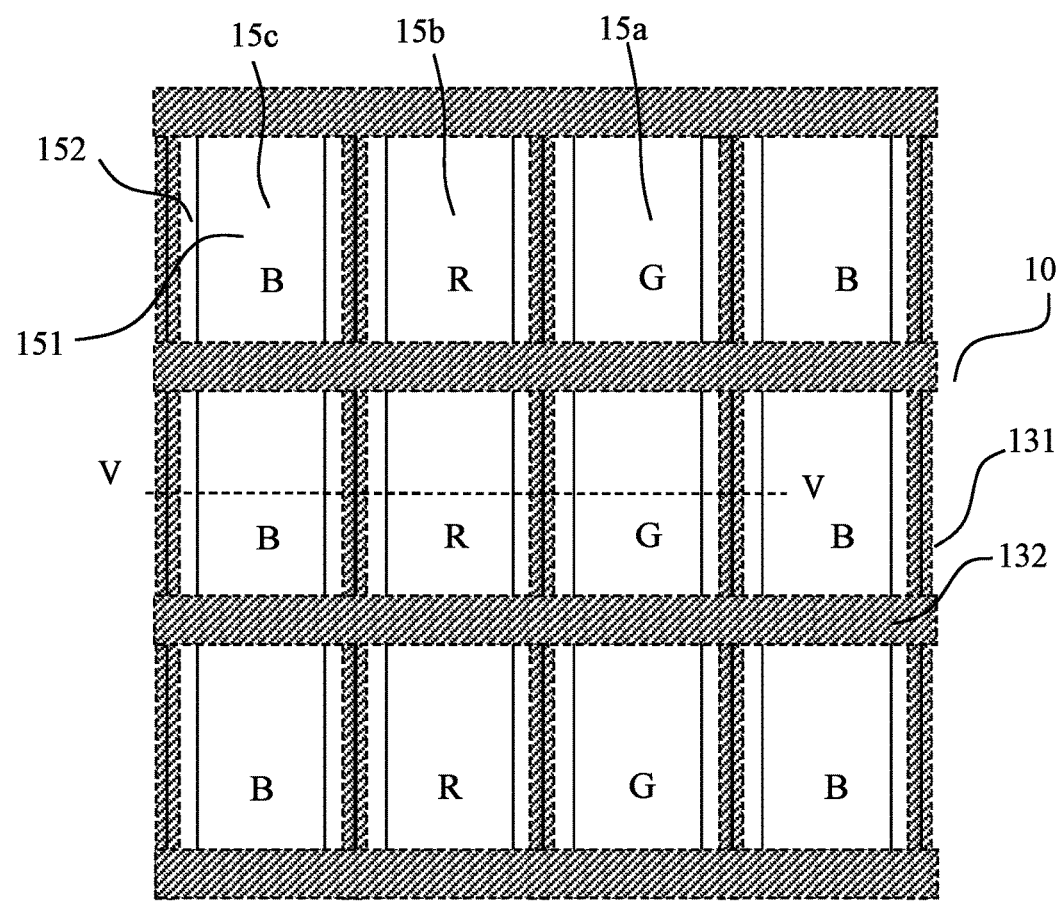
FIG. 2 illustrates a top view of an exemplary color filter plate consistent with disclosed embodiments.
Figure 3:
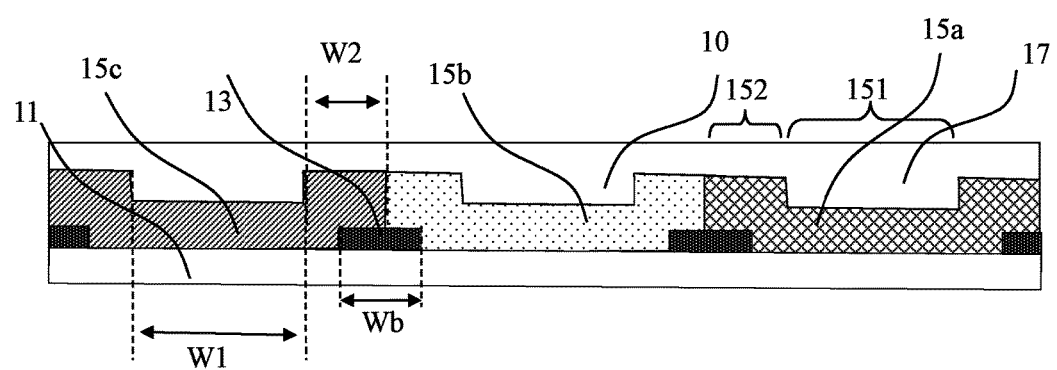
FIG. 3 illustrates a VV' sectional view of an exemplary color filter plate in FIG. 2 consistent with disclosed embodiments.

FIG. 2 illustrates a top view of an exemplary color filter plate consistent with disclosed embodiments. FIG. 3 illustrates a VV' sectional view of an exemplary color filter plate in FIG. 2 consistent with disclosed embodiments. As shown in FIG. 2 and FIG. 3, a color filter plate 10 includes a substrate 11, a plurality of first color filter elements 15a, a plurality of second color filter elements 15b, and a plurality of third color filter elements 15c disposed on the substrate 11.

In a row direction of the color filter plate 10, the plurality of first color filter elements 15a, the plurality of second color filter elements 15b and the plurality of third color filter elements 15c may be alternately arranged. The second color filter element 15b and the third color filter element 15c may be separated by the first color filter element 15a. In a column direction of the color filter plate 10, color filter elements of a same color may be repeatedly arranged, for example, a column of the first color filter elements 15a may consists of repeatedly arranged first color filter elements 15a.

Further, the color filter plate 10 may include a planarization layer 17 covering the plurality of first color filter elements 15a, the plurality of second color filter elements 15b and the plurality of third color filter elements 15c. The planarization layer 17 may flatten a surface of the color filter plate 10.

Specifically, each color filter element in the color filter plate 10 may include a body portion 151 and edge portions 152 at sides of the body portion 151. The edge portions 152 may extend along the column direction of the color filter plate 10. The color filter elements of at least one color may have at least one edge portion 152 thicker than the corresponding body portion 151, respectively.

In one embodiment, the two edge portions 152 of the first color filter element 15a, the second color filter element 15b and the third color filter element 15c may be thicker than the corresponding body portion 151, respectively. Further, the two edge portions 152 of the first color filter element 15a, the second color filter element 15b and the third color filter element 15c may have a same thickness of approximately 2.7 μm-3.7 μm. Meanwhile, the body portion 151 of the first color filter element 15a, the body portion 151 of the second color filter element 15b and the body portion 151 of the third color filter element 15c may have a same thickness of approximately 1.7 μm-2.7 μm.

Further, the color filter plate 10 may also include a black matrix 13 disposed on the substrate 11. The black matrix 13 may include a plurality of first parts 131 extending in the column direction of the color filter plate 10, and a plurality second parts 132 extending in the row direction of the color filter plate 10. The first parts 131 may separate the adjacent color filter elements arranged in the column direction of the color filter plate 10.

The edge portion 152 of one color filter element may be connected with the edge portion 152 of the adjacent color filter element. That is, there may be no gap between two adjacent or connected edge portions, which may increase the surface flatness of the color filter plate 10. The first part 131 of the black matrix 13 may have a width of Wb in the row direction of the color filter plate 10. The two adjacent edge portions may overlap the black matrix 13 by a width of Wb/2, respectively.

The two adjacent edge portion 152 may have a width of W2 in the row direction of the color filter plate 10 respectively, particularly W2=Wb/2+2 μm. The body portion 151 of each color filter element may have a width of W1 in the row direction of the color filter plate 10, particularly W1=Wb+4 μm. That is, the width W1 of the body portion 151 may be twice the width W2 of the edge portion 152. In certain other embodiments, according to the requirement of the light transmittance and the color shift improvement, a ratio between the width of the body portion 151 and the width of the edge portion 152 may be set as other values.

The width Wb of the first part 131 of the black matrix 13 in the row direction of the color filter plate 10 may be approximately 5 μm-6 μm. The width W1 of the body portion 151 may be approximately 9 μm-10 μm, and the width W2 of the edge portion 152 may be approximately 4.5 μm-5 μm. The edge portion 152 in each color filter element and each color filter element itself may have a same length in the column direction of the color filter plate 10, which may be also equal to a width of two adjacent second parts 132 of the black matrix 13.

The first color filter elements 15a may be green color filter elements, the second color filter element 15b may be red color filter elements, and the third color filter elements may be blue color filter elements.

Figure 4:
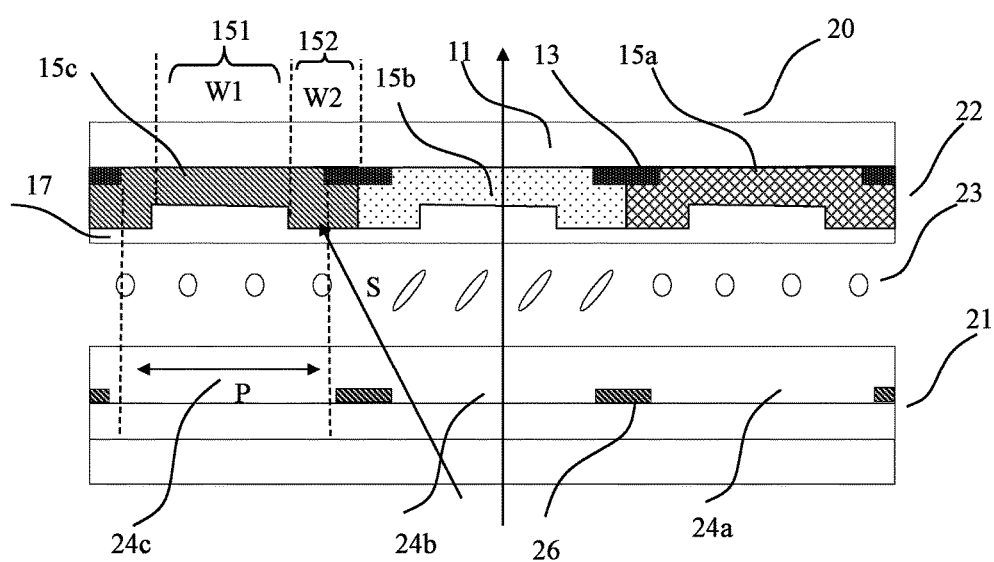
FIG. 4 illustrates a cross-sectional view of an exemplary LCD panel comprising an exemplary color filter plate in FIG. 2 consistent with disclosed embodiments.

The above-mentioned color filter plate 10 may be adopted in a variety of display devices. FIG. 4 illustrates a cross-sectional view of an exemplary LCD panel comprising an exemplary color filter plate in FIG. 2 consistent with disclosed embodiments. As shown in FIG. 4, the LCD panel 20 may include an array substrate 21, a color film substrate 22 arranged in opposite to the array substrate 21, and a liquid crystal layer 23 disposed between the array substrate 21 and the color film substrate 22.

The array substrate 21 may further include a plurality of first pixel 24a, a plurality second pixel 24b and a plurality of third pixel 24c. Adjacent pixels may be separated by the metal lines disposed on the array substrate 21, such as data lines 26 and etc. The array substrate 21 may also include a plurality of thin film transistors controlling pixels, gate lines and pixel electrodes. The thin film transistors, the gate lines and the pixel electrodes may be disposed on a layer above or beneath the data lines 26, respectively. FIG. 4 may only show an illustrative diagram of the array substrate 21, and is not intended to limit the structure of the array substrate 21.

Further, the color film substrate 22 may include a black matrix 13, a plurality of first color filter element 15a, a plurality of second color filter element 15b and a plurality of third color filter element 15c. All the color filter elements may be separated by the black matrix 13. The first color filter elements 15a, the second color filter elements 15b and the third color filter elements 15c may one-to-one correspond to the first pixels 24a, the second pixels 24b and the third pixels 24c, respectively.

Each color filter element may include two edge portions 152 and one body portion 151 between the two edge portions 152. The body portion 151 in each color filter element may correspond to a light transmitting region P in each pixel. Each edge portion 152 may have a part overlapping a first part 131 of the black matrix 13 and another part overlapping the light transmitting region in each pixel.

In certain embodiments, the body portion 151 of each color filter element may have a thickness of approximately 2.6 µm, the edge portion 152 of each color filter element may have a thickness of approximately 3.6 µm. The body portion 151 of each color filter element may have a width of approximately 9.5 µm in the row direction, and the edge portion 152 of each color filter element may have a width of approximately 4.75 µm in the row direction.

Further, the color film substrate 22 may also include a planarization layer 17 covering the black matrix 13, the first color filter elements 15a, the second color filter elements 15b and the third color filter elements 15c, to flatten a surface of the color film substrate 22. The planarization layer 17 in the color filter plate 10 and an alignment layer of the LCD panel 20 may be disposed in a same layer.

The first color filter elements 15a may be green color filter elements, the second color filter element 15b may be red color filter elements, and the third color filter elements may be blue color filter elements. The combination of the color filter elements may be used to display images of different colors.

Taking a red image as an example. When the LCD panel is required to display a red image, the liquid crystal molecules in the liquid crystal layer 23 beneath the second color filter element 15b may be reoriented by a voltage applied to the second pixel 24b, while the liquid crystal molecules beneath the first color filter element 15a and the third color filter element 15b may keep an original orientation, respectively. That is, light may only be allowed to transmit through the red color filter elements 15b to display a red image.

Assuming due to the misalignment between the array substrate 21 and the color film substrate 22 or some other reasons, the light which should be incident on the second color filter elements 15b may be partially incident on the adjacent first color filter elements 15a and the adjacent third color filter elements 15c. For example, as shown in FIG. 4, light S transmitting through the second pixel 24b may be incident on the edge portion 152 of the third color filter element 15c, which is adjacent to the second color filter element 15b. Compared to the body portion 151, the edge portion 152 may be considered as a raised part or a bump of a larger thickness.

Increasing the thickness of the color filter elements may reduce the light transmittance and, thus the edge portion 152 with an increased thickness may partially prevent the light from transmitting through the first color filter element 15a (blue color filter element). Thus a purple color shift caused by a mixing of the red image and the blue light may be reduced.

Similarly, increasing the thickness of the edge portion 152 of the first color filter element 15a adjacent to the second color filter element 15b (green color filter element) may reduce a yellow color shift, which is caused by a mixing of the red image and the green light. Thus the color shift caused by the misalignment between the array substrate 21 and the color film substrate 22 or other reasons may be improved. Especially, the color shift at large viewing angles may be improved.

Because only the thickness of the edge portion 152 may be increased while the thickness of the body portion 151 remained, the color shift caused by the misalignment between the array substrate 21 and the color film substrate 22 may be improved and, meanwhile the light transmittance of the body portion 151 may be unchanged.

Figure 5:
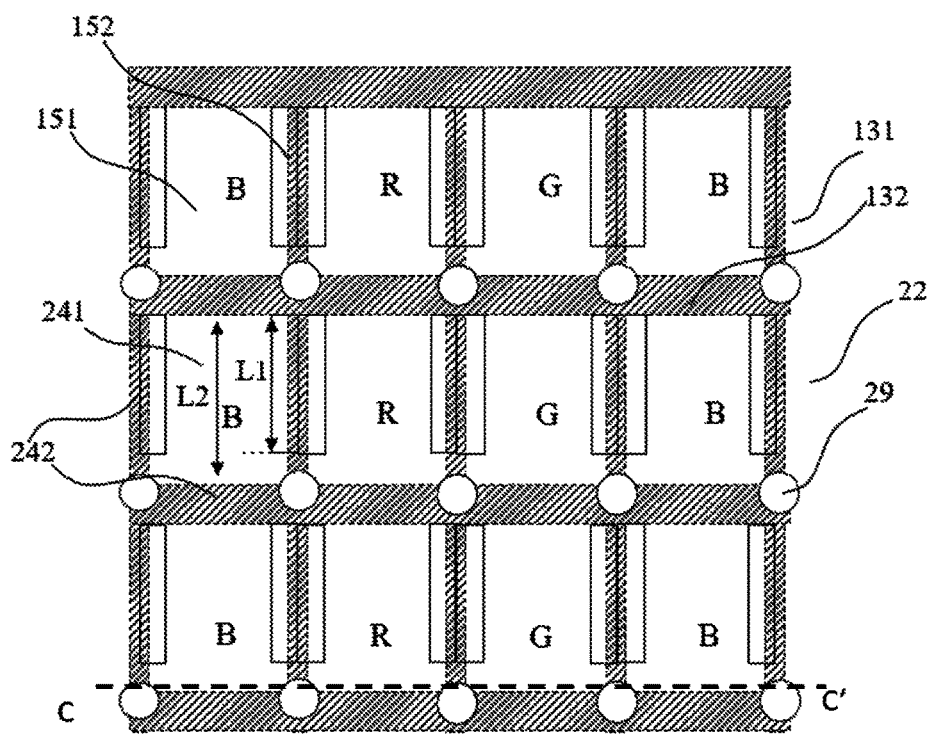
FIG. 5 illustrates a top view of an exemplary color film substrate consistent with disclosed embodiments.
Figure 12:
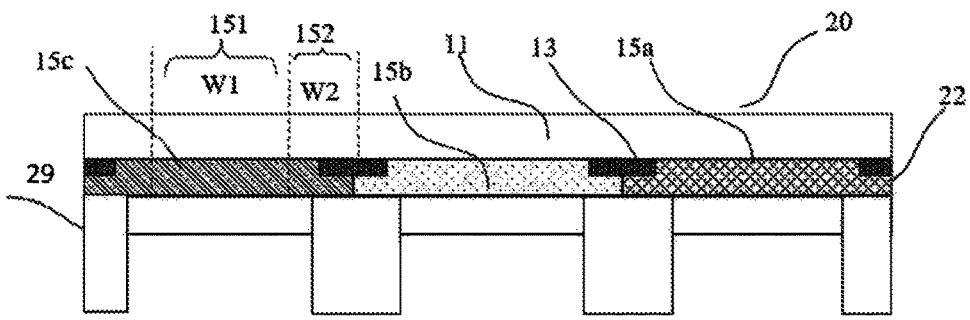
FIG. 12 illustrates a CC'-sectional view of an exemplary color film substrate in FIG. 5 consistent with disclosed embodiments.

FIG. 5 illustrates a top view of an exemplary color film substrate consistent with disclosed embodiments. FIG. 12 illustrates a CC'-sectional view of an exemplary color film substrate in FIG. 5 consistent with disclosed embodiments. As shown in FIG. 5 and FIG. 12, an LCD panel may further include spacers 29 to keep a uniform cell gap. The spacers 29 may be formed on any substrates of the LCD panel. If formed on a color film substrate 22, the spacers 29 may usually be directly formed on color filter elements. Each color filter element may include two edge portions 152 and one body portion 151 between the two edge portions 152. In order to keep the spacers 29 stable on the color film substrate 22, the color filter elements beneath the spacers 29 may have a uniform thickness. For example, the spacers 29 may be disposed regions adjacent to but still beyond the edge portions 152 of the color filter elements.

As shown in FIG. 5, a black matrix 13 may include a plurality of first part 131 extending in a row direction of the color film substrate 22, and a plurality of second part 132 extending in a column direction of the color film substrate 22. Each pixel on an array substrate 21 opposite to the color film substrate 22 may include a light shielding region 242 and a light transmitting region 241. The light shielding region 242 may correspond to the first part 131 of the black matrix 13 and the second part 132 of the black matrix 13.

The edge portion 152 of each color filter element may overlap the first part 131 of the black matrix 131. The edge portion 152 of each color filter element may have a length of L1 in the column direction of the color film substrate 22, which may be smaller than a length L2 of the light shielding region 142 in each pixel. That is, the body portion 151 of each color filter element may be confined by the two edge portions 152 of each color filter element and two adjacent second parts 132 of the black matrix 13.

The spacer 29 may be disposed between the adjacent edge portions 152 of two adjacent color filter elements in the column direction. The color filter element beneath the spacer 29 may have a same thickness as the body portion 151. That is, the color filter element beneath the spacers 29 may have a uniform thickness. In addition to the improved color shift caused by substrates misalignment, an ensured stability of the spacers 29 on the color film substrate 22 may be achieved. Thus the LCD panel may have an improved cell gap stability.

In one embodiment, the length L1 of the edge portion 152 in each color filter element in the column direction of the color film substrate 22 may be equal to the length L2 of the light shielding region 142 in each pixel. The spacers 29 may be formed on the second part 132 of the black matrix 13. The color filter elements beneath the spacers 29 may still have a uniform thickness, and the spacers 29 on the color film substrate 22 may also have an ensured stability.

In another embodiment, two edge portions 152 in each color filter element may have a different length. For example, the length L1 of one edge portion 152 with the adjacent spacer 29 in each color filter element may be smaller than the length L2 of the light shielding region 142 in each pixel, while the length L1 of the other edge portion 152 without the adjacent spacer 29 in each color filter element may be larger than or equal to the length L2 of the light shielding region 142 in each pixel. The color filter elements beneath the spacers 29 may still have a uniform thickness.

In certain other embodiments, the length L1 of the edge portion 152 in each color filter element may be larger than the length L2 of the light shielding region 142 in each pixel. However, two edge portions 152 in each color filter element may have a different thickness. For example, one edge portion 152 with the adjacent spacer 29 may have a same thickness as the body portion 151, while the other edge portion 152 without the adjacent spacer 29 may have a larger thickness than the body portion 151. In addition to the improved color shift caused by substrates misalignment, an ensured stability of the spacers 29 on the color film substrate 22 may be achieved. Thus the LCD panel may have an improved cell gap stability.

Figure 6:
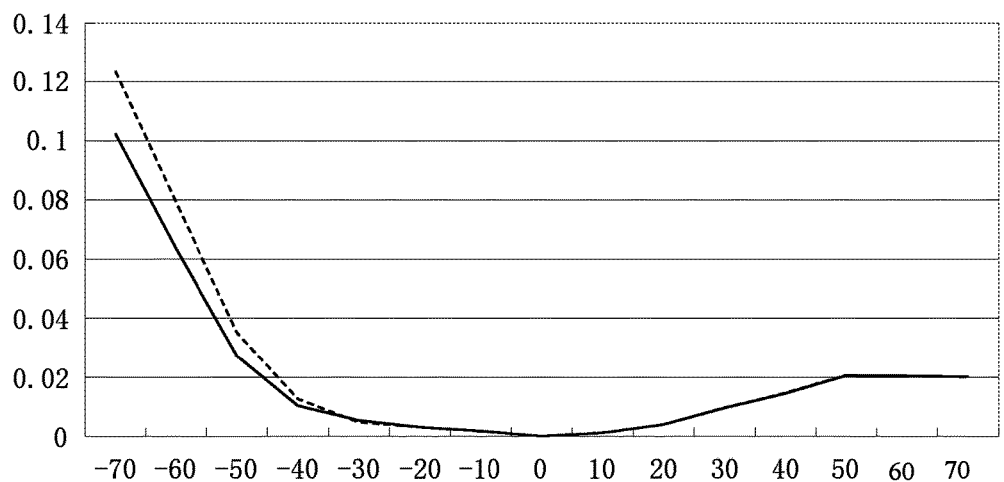
FIG. 6 illustrates a simulation result of color shift improvement in an exemplary LCD panel in FIG. 4 consistent with disclosed embodiments.

FIG. 6 illustrates a simulation result of color shift improvement in an exemplary LCD panel in FIG. 4 consistent with disclosed embodiments. As shown in FIG. 4 and FIG. 6, a horizontal axis represents an angle between an observer's location and a normal direction of the LCD panel 20. A vertical axis represents a color coordinate difference, which indicates a difference between an actual color coordinate value and a target color coordinate value. That is, a color coordinate difference may indicate a color shift, a larger color coordinate difference means a larger color shift in a LCD panel.

Figure 1:
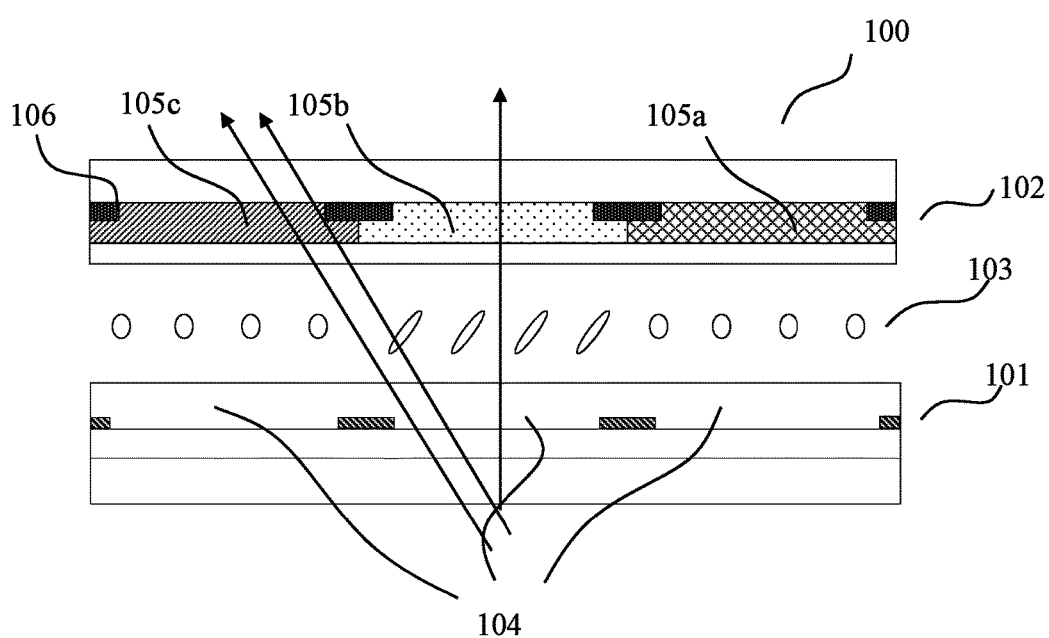
FIG. 1 illustrates a cross-sectional view of a conventional LCD panel.

As shown in FIG. 6, a dotted line represents the color shift in the conventional LCD panel in FIG. 1. The conventional LCD panel has a uniform color filter element layer, which is 2.6 μm. The misalignment between the array substrate 101 and the color film substrate 102 is 2 μm. A solid line represents the color shift in the LCD panel 20 consistent with the disclosed embodiments. In the LCD panel 20, the body portion 151 of the color filter element 15 has a thickness of 2.6 μm, the edge portion 152 has a thickness of 3.6 μm, the body portion 151 has a width of 9.5 μm in the row direction, and the edge portion 152 has a width of 4.75 μm in the row direction. The misalignment between the array substrate 21 and the color film substrate 22 is also 2 μm.

When the angel between the observer's location and the normal direction of the LCD panel is 50°, as shown in FIG. 6, the LCD panel 20 consistent with the disclosed embodiments may have a smaller color shift than the conventional LCD panel. That is, the LCD panel 20 comprising the color filter plate 10 consistent with the disclosed embodiments may apparently improve the color shift, as compared to the conventional LCD panel.

Figure 7A:
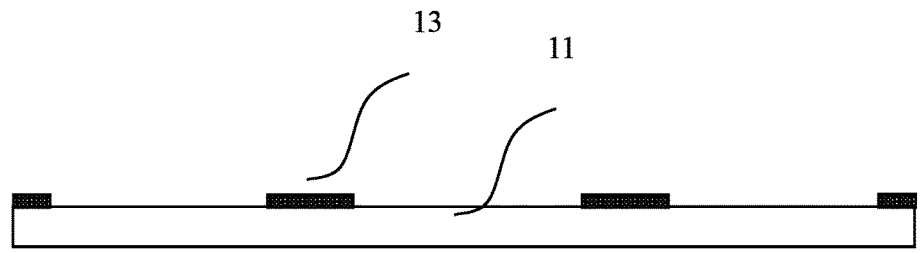
FIG. 7a-7f illustrate schematics of an exemplary fabrication process of an exemplary color filter plate in FIG. 2 consistent with disclosed embodiments.
Figure 10:
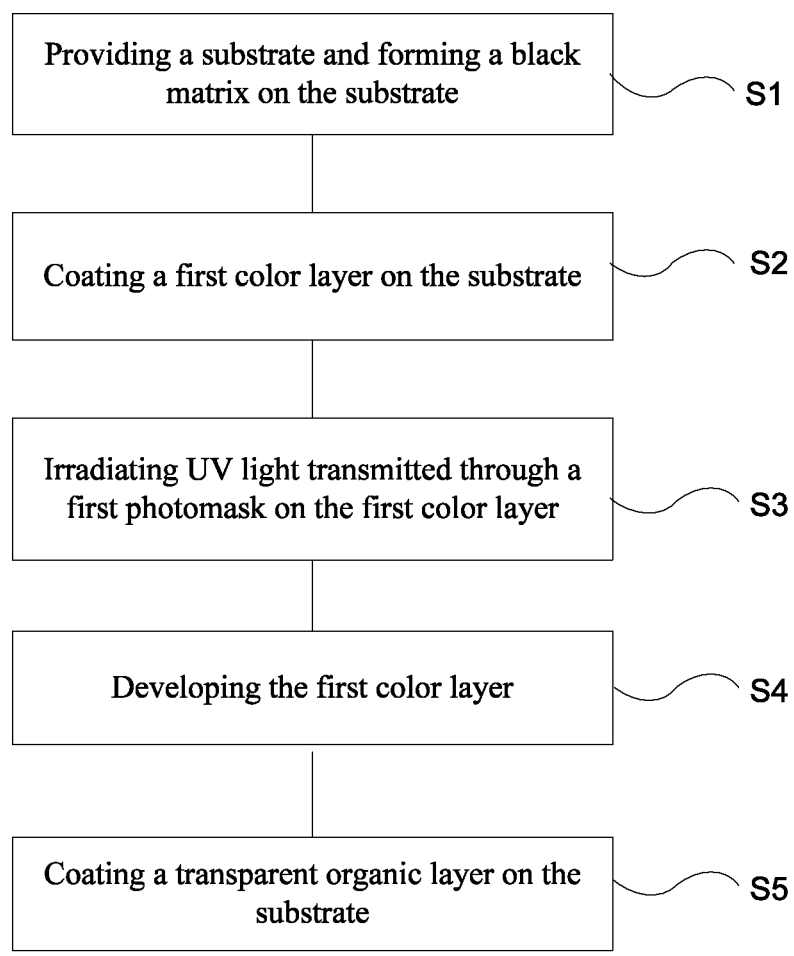
FIG. 10 illustrates a flow chart of an exemplary fabrication process of an exemplary color filter plate in FIG. 2 consistent with disclosed embodiments.

Another aspect of the present disclosure provides a fabrication method of the color filter plate. The fabrication method of the color filter plate 10 in FIG. 2 is provided in the following for illustrative purposes. FIG. 10 illustrate a flow chart of an exemplary fabrication process of an exemplary color filter plate in FIG. 2 consistent with disclosed embodiments. FIG. 7a-7f illustrate schematics of an exemplary fabrication process of an exemplary color filter plate in FIG. 2 consistent with disclosed embodiments;

As shown in FIG. 10, at the beginning, a transparent substrate 11 is provided, and a black matrix 13 is formed on the transparent substrate 11(S1). FIG. 7a illustrates a cross-sectional view of a corresponding structure.

As shown in FIG. 7a, a dark light shielding resin layer is deposited on the transparent substrate 11. After a patterning process, a black matrix 13 may be formed.

Figure 7B:
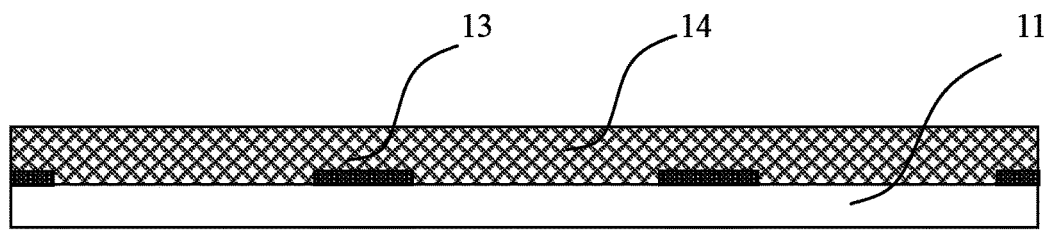

Returning to FIG. 10, after forming the black matrix 13 on the transparent substrate 11, a first color layer is coated and cured n the transparent substrate 11 (S2). FIG. 7b illustrates a cross-sectional view of a corresponding structure.

As shown in FIG. 7b, a curable color composition of a first color is coated an entire surface of the transparent substrate 11 with the black matrix 13. Then the color composition is baked or cured at 80° C. or above, and a cured first color layer 14 is formed.

Figure 7C:
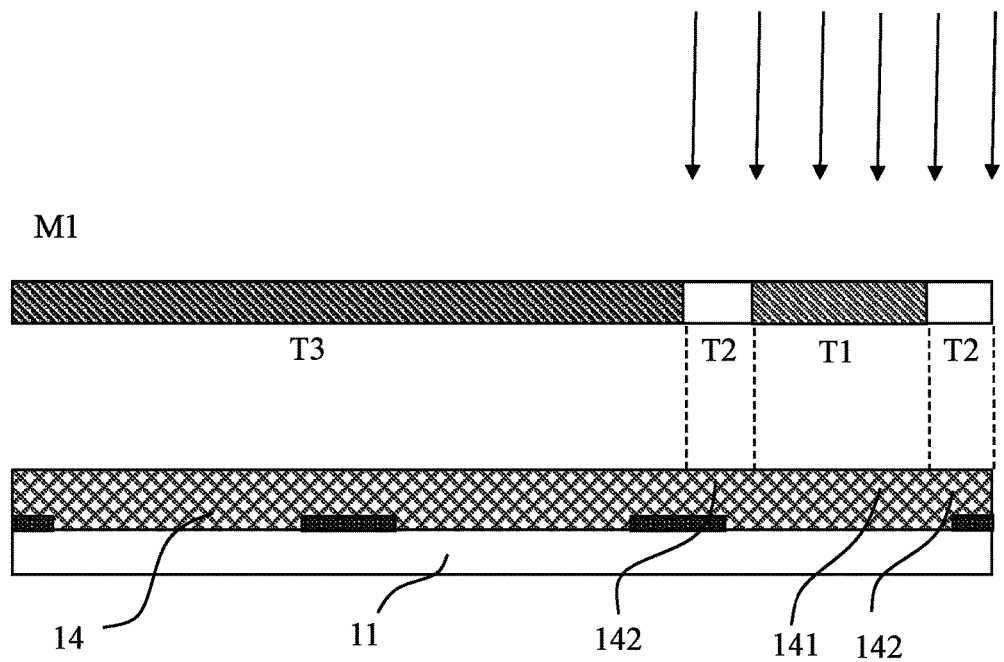
Figure 7D:
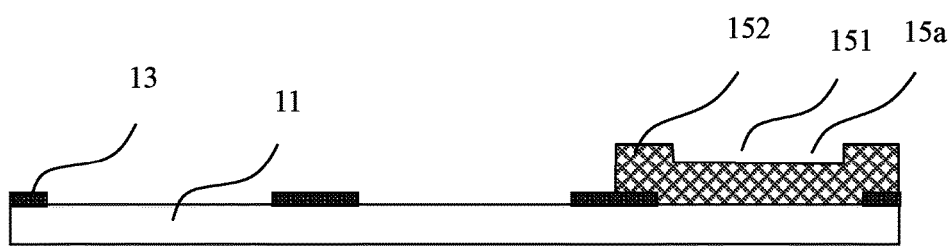

Returning to FIG. 10, further, the first color layer is exposed to ultraviolet (UV) light transmitted through a first photomask (S3). FIG. 7c and FIG. 7d illustrate cross-sectional views of a corresponding structure.

As shown in FIG. 7c, a first photomask M1 is disposed above the first color layer 14, and UV light transmitted through the first photomask M1 irradiates the first color layer 14, for a selectively UV exposure. In particular, the first photomask M1 may include a plurality of partially transparent regions T1 one-to-one corresponding to a plurality of first regions 141 in the first color layer 14, a plurality of transparent regions T2 one-to-one corresponding to a plurality of second regions 142 in the first color layer 14, and a plurality of opaque regions T3.

Further, the opaque region T3 may be made from an opaque chromium film. The partially transparent region T2 may be made from thin-film materials having partial optical transmittance, or may be formed by a grating. By controlling the transmittance of the partially transparent region T2, the UV exposure depth of the first region 141 in the first color layer 14 may be controlled. Thus, a desired color filter element thickness may be obtained. For example, as shown in FIG. 7d, an edge portion 152 of a first color filter element 15a may have a lager thickness than a body portion 151 of the first color filter element 15a.

Figure 7E:
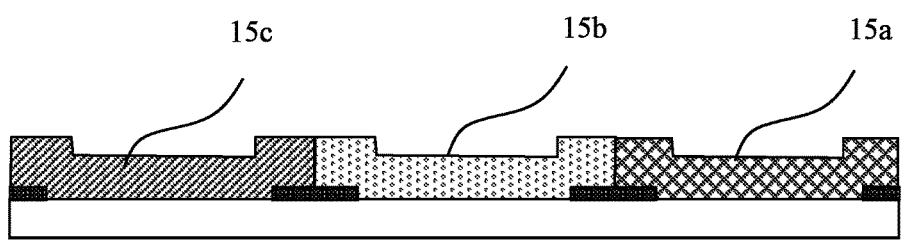

Returning to FIG. 10, further, the first color layer is developed to form a plurality of first color filter elements (S4). FIG. 7d and FIG. 7e illustrate cross-sectional views of a corresponding structure. The edge portion 152 of the first color filter element 15a may have a larger thickness than the body portion 151 of the first color filter element 15a.

Specifically, as shown in FIG. 7d, a part of the first region 141 in the first color layer 14 is selectively removed by an etching process to form the body portion 151, while the second region 142 in the first color layer 14 is retained to form the edge portion 152. The edge portion 152 of the first color filter element 15a may partially overlap the black matrix 13 at the border of the black matrix 13. The edge portion 152 of the first color filter element 15a may have a thickness of approximately 2.7 μm-3.7 μm, and the body portion 151 of the first color filter element 15a may have a thickness of approximately 1.7 μm-2.7 μm.

Further, as shown in FIG. 7e, through repeating the above-mentioned S2, S3 and S4, a plurality of second color filter elements 15b and a plurality of third color filter elements 15c may be formed by using the first photomask M1, respectively. The body portion 151 of the second color filter element 15b and the body portion 151 of the third color filter element 15c may have a same thickness as the body portion 151 of the first color filter element 15a, respectively. The edge portion 152 of the second color filter element 15b and the edge portion 152 of the third color filter element 15c may have a same thickness as the edge portion 152 of the first color filter element 15a, respectively.

Figure 7F:
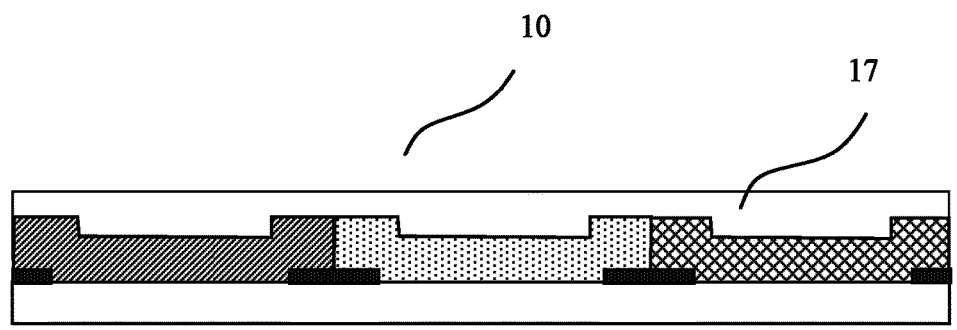

Returning to FIG. 10, further, a transparent organic material is coated on the substrate having the color filter elements (S5). FIG. 7f illustrates a cross-sectional view of a corresponding structure.

As shown in FIG. 7f, a transparent organic material is coated on the substrate 11 having the first color filter elements 15a, the second color filter elements 15b and the third color filter elements 15c, such as a composition of acrylic resin, naphthoquinone diazide ester, 1,4 dioxane, coupling agents, diethylene glycol methyl ether and propylene glycol methyl ether acetate composition.

Because the organic material may flow during the coating process, gaps between the edge portions 152 and the body portions 151 in the color filter elements may be filled and flattened by the organic material. After baking, the organic material may form a planarization layer 17, which may flatten the color filter plate 10. The formed color filter plate 10 is show in FIG. 7f.

The fabrication method of the color filter plate 10 may not need an extra photomask. Through only utilizing the first photomask M1 having partially transparent regions, the color filter plate 10 having color filter elements of different thickness in different regions may be realized. The fabrication steps may be simple and the cost may be reduced.

The color filter plate shown in FIG. 5 may also be obtained through the disclosed fabrication method, in particular, through adjusting the shapes of the partially transparent regions T1 and the transparent regions T2 of the photomask M1.

Figure 8:
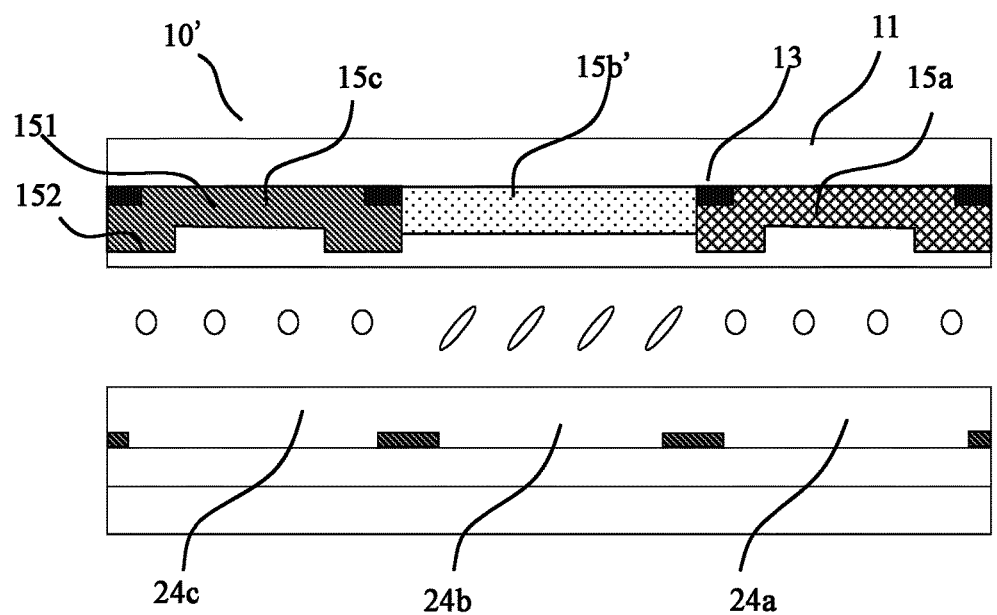
FIG. 8 illustrates a cross-sectional view of another exemplary LCD panel consistent with disclosed embodiments.

FIG. 8 illustrates a cross-sectional view of another exemplary LCD panel consistent with disclosed embodiments. As shown in FIG. 8, the LCD panel in FIG. 8 may have a similar structure as the LCD panel in FIG. 4. The LCD panel may include an array substrate 21, an opposite color film substrate 22, and a liquid crystal layer between the array substrate 21 and the color film substrate 22. However, a color filter plate 10' disposed on the color film substrate 22 in FIG. 8 may have a different color filter element structure, as compared to the color filter plate 10.

Specifically, the color filter plate 10' may include a black matrix 13, a plurality of first color filter elements 15a, a plurality of second color filter elements 15b' and a plurality of third color filter element 15c separately by the black matrix 13. The plurality of first color filter elements 15a, the plurality of second color filter elements 15b' and the plurality of third color filter elements 15c may one-to-one correspond to a plurality of first pixels 24a, a plurality second pixels 24b and the plurality of third pixels 24c, respectively.

Each color filter element may have a body portion 151 and two edge portions 152. In the first color filter element 15a and the third color filter element 15c, the edge portion 151 may be thicker than the body portion 152, respectively. In the second color filter element 15b', the edge portion 151 and the body portion 152 may have a same thickness, i.e., the second color filter element 15b' as a whole may have a uniform thickness.

The edge portion 152 of the first color filter element 15a and the edge portion 152 the third color filter element 15c may have a thickness of approximately 2.7 μm-3.7 μm, respectively. The body portion 151 of the first color filter element 15a and the body portion 151 of the third color filter element 15c may have a thickness of approximately 1.7 μm-2.7 μm, respectively. The body portion 151 and the edge portion 152 may have a width of approximately 4.5 μm-5 μm and approximately 9 μm-10 μm in a row direction of the color film substrate 22, respectively.

Specificity, the first color filter elements 15a may be green color filter elements, the second color filter element 15b' may be red color filter elements, and the third color filter elements 15c may be blue color filter elements. That is, the color filter plate 10' may include a plurality of green color filter elements 15a, a plurality of red color filter elements 15b' and a plurality of blue color filter elements 15c.

The color filter elements of different colors in the color filter plate may exhibit different light transmittance. In particular, among the green color filter element 15a, the red color filter element 15b' and the blue color filter element 15c, the green color filter element 15a may have a highest light transmittance ($1^{st}$ high light transmittance), the red color filter element 15b' may have a lower light transmittance ($2^{nd}$ high light transmittance), and the blue color filter element 15c may have a lowest light transmittance ($3^{rd}$ high light transmittance). Even light with different colors but with a same power is incident into human eyes, human eyes are most sensitive to green light. Thus, when the light transmitted through the second pixel 24b is deflected to the green color filter element 15a, a color shift may be most likely to occur and a yellow color shift in a red image may be observed.

In the disclosed embodiments, the edge portion 152 of the green color filter element 15a may be thicker than the body portion 151 of the green color filter element 15a. That is, the edge portion 152 of the green color filter element 15a may have an increased thickness. The light transmitted through the second pixels 24b may be deflected at adjacent regions among the red color filter elements 15b' and the green color filter elements 15a, and then incident on the edge portions 152 of the green color filter elements 15a. Due to the increased thickness of the edge portions 152 of the green color filter elements 15a, the light transmittance at the edge portions 152 of the green color filter elements 15a may be reduced. That is, most of the deflected light may not be able to transmit through the green color filter elements 15a to display a green color. Thus a yellow shift in a red image may be reduced, and a corresponding color shift may be improved.

In addition, the light transmitted through the second pixels 24b may also be deflected to the blue color filter elements 15c, a purple color shift in a red image may be observed. To improve the color shift, the edge portions 152 of the blue color filter element 15c may be designed to be thicker than the body portion 151 of the blue color filter element 15c. That is, the thickness of the edge portion 152 of the blue color filter element 15c may be increased while the light transmittance at the edge portion 152 of the blue color filter element 15c may be reduced. As a result, most of the light deflected to the edge portions 152 of the blue color filter elements 15c may not be able to transmit through the blue color filter elements 15c to display a blue color. Thus a purple shift in the red image may be reduced, and a corresponding color shift may be improved.

In the disclosed embodiments, the edge portion 152 and the body portion 151 of the red color filter element 15b' may have a same thickness. That is, the edge portion 152 of the red color filter element 15b' may not have an increased thickness. Thus the light transmittance of the red color filter elements 15b' may be effectively retained.

When displaying a green image, light transmitted through the first pixels 24a may be partially deflected at adjacent regions among the red color filter elements 15b' and the green color filter elements 15a, and then incident on the red color filter elements 15b'. However, the red color filter elements 15b' may have a lower light transmittance as compared to the green color filter elements 15c and, meanwhile, human eyes may be less sensitive to the red light. Thus the deflected light may have a weak effect on a green image and a color shift may not happen, or the color shift may be too weak for the human eyes to recognize.

Further, when displaying a blue image, human eyes may be less sensitive to the blue light and, meanwhile the blue color filter element 15c may have a lower light transmittance, thus the blue image itself may be dark. In addition, purple (wavelength: 380 nm-460 nm) and blue (wavelength: 450 nm-490 nm) wavelength has a close wavelength. Thus even a small amount of red light is mixed into the blue image to generate a purple color shift, human eyes may still not recognize. Thus the edge portion 152 of the red color filter element 15b' may not have a noticeable effect on the color shift, as compared to the edge portion 152 of the green color filter element 15a and the edge portion 152 of the blue color filter element 15c. Considering the light transmittance of the whole red color filter element 15b' is not affected, the edge portion 152 of the red color filter element 15b' may not need to have an increased thickness.

In the disclosed embodiments, only the edge portion 152 of the green color filter element 15a and the edge portion 152 of the blue color filter element 15c may have an increased thickness, respectively, while the edge portion 152 of the red color filter element 15b' may still have a same thickness as the body portion 151 of the red color filter element 15b'. The color filter plate 10' with such a structure may effectively improve the color shift caused by the substrates misalignment without reducing the light transmittance of the red color filter elements 15b'

Figure 9:
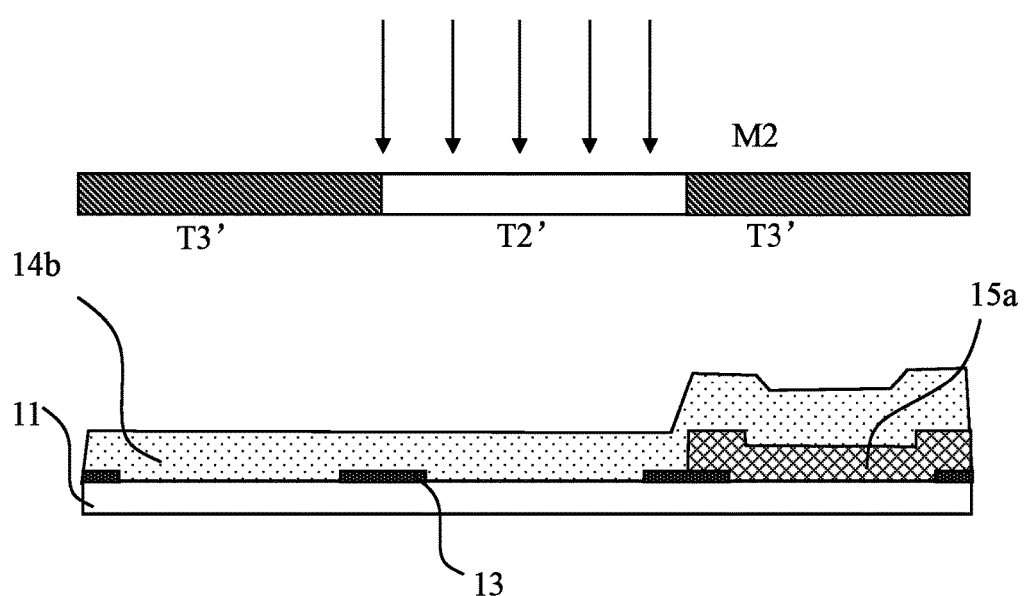
FIG. 9 illustrates schematics of an exemplary fabrication process of another exemplary color filter plate in FIG. 8 consistent with disclosed embodiments.
Figure 11:
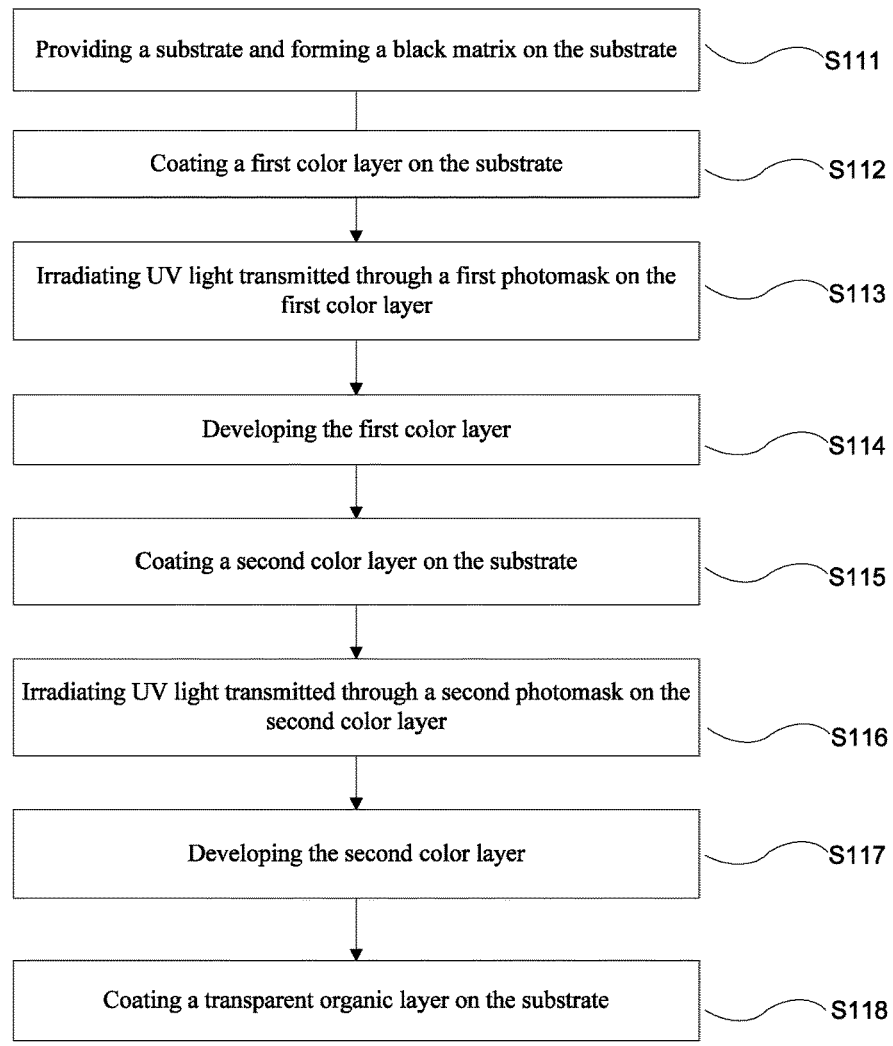
FIG. 11 illustrates a flow chart of another exemplary fabrication process of another exemplary color filter plate in FIG. 8 consistent with disclosed embodiments.

Another aspect of the present disclosure provides a fabrication method of the color filter plate. FIG. 8 illustrates a cross-sectional view of another exemplary LCD panel consistent with disclosed embodiments. The LCD panel shown in FIG. 8 comprises the above-mentioned color filter plate 10'. The fabrication method of the color filter plate 10' in FIG. 8 is provided for illustrative purposes. FIG. 11 illustrate a flow chart of another exemplary fabrication process of another exemplary color filter plate in FIG. 8 consistent with disclosed embodiments. FIG. 9 illustrate a schematics of an exemplary fabrication process of another exemplary color filter plate in FIG. 8 consistent with disclosed embodiments. The fabrication method of the color filter plate 10' in FIG. 8 is similar to the fabrication method of the color filter plate 10 in FIG. 2.

As shown in FIG. 11, at the beginning, a transparent substrate 11 is provided, and a black matrix 13 is formed on the transparent substrate 11(S111). A first color layer 14 is coated and cured on the transparent substrate 11(S112). The first color layer 14 may be a green color layer. Then, the first color layer 14 is exposed to UV light transmitted through a first photomask M1 (S113). The first color layer 14 is developed to form a plurality of first color filter elements 15a (S114). The first color filter element 15a may include two edge portions 152 and a body portion 151. The edge portion 152 of the first color filter element 15a may have a larger thickness than the body portion 151 of the first color filter element 15a.

Further, the fabrication method of the color filter plate 10' in FIG. 8 may include a process to form a plurality of second color filter elements 15b'. The second color filter element 15b' may include two edge portions 152 and one body portion 151 between the two edge portions 152. A second color layer is coated on the transparent substrate 11 and later cured (S115). FIG. 9 illustrates a cross-sectional view of a corresponding structure. As shown in FIG. 9, a second color layer 14b' is coated and cured on the transparent substrate 11. The second color layer 14b' may have a same thickness as the body portion 151 of the second color filter element 15b'. The second color layer 14b' may be a red color layer.

Returning to FIG. 11, the second color layer 14b' is exposed to UV light transmitted through a second photomask M2 (S116). As shown in FIG. 9, the second photomask M2 may include a plurality of transparent regions T2' and a plurality of opaque region T3', in which the plurality of transparent regions T2' may one-to-one correspond to the plurality of second color filter elements 15b' in the second color layer 14b'.

Returning to FIG. 11, the second color layer 14b' is developed to form the plurality of second color filter element 15b' (S117). As shown in FIG. 9, the edge portion 152 the second color filter element 15b' may have a same thickness as the body portion 151 of the second color filter element 15b'. Further, through repeating the above-mentioned S2, S3 and S4, a plurality of third color filter elements 15c shown in FIG. 8 may be formed by using the first photomask M1.

Returning to FIG. 11, a transparent organic material is coated on the substrate 11 having the first color filter elements 15a, the second color filter elements 15b' and the third color filter elements 15c (S118), such as a composition of acrylic resin, naphthoquinone diazide ester, 1,4 dioxane, coupling agents, diethylene glycol methyl ether and propylene glycol methyl ether acetate.

Because the organic material may flow during the coating process, gaps between the edge portion 152 and the body portion 151 in the color filter elements may be filled and flattened by the organic material. After baking, the organic material may form a planarization layer 17, which may help to flatten the color filter plate 10'. The eventually formed color filter plate 10 is show in FIG. 8.

The disclosed embodiments are only for illustrative purposes, and are not intended to limit the structure of the color filter plate. According to various requirements, in certain other embodiments, only the edge portion 152 of the first color filter element 15a may have a larger thickness than the body portion 151 of the first color filter element 15a, while the edge portion 152 of the second color filter element 15b' and the edge portion 152 of the third color filter element 15c may still have a same thickness as the body portion 151 of the second color filter element 15b' and the body portion 151 of the third color filter element 15c, respectively. In this way, a color shift caused by the first color filter elements 15a may be improved.

In an early stage of the color filter plate fabrication, because of the black matrix, the regions where the color filter elements overlap the black matrix stripes have a larger thickness than the color filter elements among the adjacent black matrix stripes. That is, the borders of the color filter elements or bumps in the color filter element layer are unavoidably raised. Thus, the color filter element layer is not flat and the images are degraded. In recent years, people have been working hard to solve the planarization of the color filter element layer, without paying attention to side effects caused by the planarization of the color filter element layer.

The current fabrication techniques of color filter plates have well solved the raised borders of the color filter elements, and color filter plates of a uniform thickness have been already fabricated. The present invention is directed to further improve the conventional color filter plates of a uniform thickness. That is, utilizing a color filter element layer with a thickness variation to improve a color shift in an LCD panel.

The color filter element layer with a thickness variation may be different from the previous color filter element layer with bumps (or raised borders of the color resists). The pumps or raised borders are caused by a stacking of films in the fabrication process, which is not controllable. The pumps or raised borders are mainly formed in areas where the color filter element layer overlaps the black matrix stripes, while the other non-overlapping areas still have a uniform thickness. Such a color filter plate may not improve the color shift.

The color filter element layer consistent with disclosed embodiments may be designed according to various requirements. That is, the width of the edge portion 152 in each color filter element, the width of the body portion 151 in each color filter element, and the thickness difference between the edge portion 152 and the body portion 151 may be controllable.

Considering the transmittance of the color filer plate and the improvement of the color shift, in one embodiment, the thickness of the edge portion 152 may be approximately 1 µm or 1.5 µm larger than the thickness of the body portion 151. In another embodiment, the width of the body portion 151 may be approximately twice as the width of the edge portion 152.

In another embodiment, the edge portion 152 may be disposed at an area between the black matrix 13 and the body portion 151, i.e. an area without the black matrix 13, to improve the color shift.

In another embodiment, to improve a specific color shift, in a color filter plate including the first color filter elements 15*a*, the second color filter elements 15*b* and the third color filter elements 15*c*, only color filter elements of one color may have the thicker edge portions 152 as compared to the body portions 151, while the edge portions 152 and the body portions 151 in the color filter elements of other colors may still have a same thickness.

All the color filter plate structures consistent with disclosed embodiments may not be realized by the raised borders in the current fabrication techniques. The color filter plates consists with the disclosed embodiments may reduce the color shift caused by the misalignment between the array substrate and the color film substrate, especially improve the color shift in LCD devices at large viewing angles.

Other applications, advantages, alternations, modifications, or equivalents to the disclosed embodiments are obvious to those skilled in the art. It is intended that the specification and embodiments be considered as exemplary only, with a true scope and spirit of the invention being indicated by the claims.

What is claimed is:
1. A color filter plate, comprising:
a substrate;
a plurality of color filter elements alternately arranged on the substrate, wherein each color filter element includes two edge portions extending in a column direction of the color filter plate and one body portion between the two edge portions, and the plurality of color filter elements comprises a plurality of first color filter elements, a plurality of second color filter elements and a plurality of third color filter elements; and
a black matrix formed on the substrate and disposed among every two adjacent color filter elements,
wherein:
at least one edge portion of a first color filter element is thicker than the body portion of the first color filter element,
the adjacent edge portions of every two adjacent color filter elements are connected to each other without a gap,
the black matrix includes a plurality of first parts extending in the column direction of the color filter plate, and a plurality second parts extending in a row direction of the color filter plate,
the body portion of the first color filter element corresponds to a light transmitting region of a pixel, the at least one edge portion of the first color filter element has a part overlapping a first part of the black matrix and another part overlapping the light transmitting region of the pixel, and the part overlapping the first part of the black matrix has a larger thickness than the body portion of the first color filter element, and
according to a light transmittance and a color shift of the color filter plate, in the row direction of the color filter element, a width of the body portion of the first color filter element is determined as approximately twice as the width of the at least one edge portion of the first color filter element, or in a direction perpendicular to the color filter element, a thickness of the at least one edge portion of the first color filter element is determined as approximately 1 µm or 1.5 µm larger than the thickness of the body portion of the first color filter element,
wherein:
the plurality of first color filter elements, the plurality of second color filter elements and the plurality of third color filter elements are alternately arranged on the substrate,
the first color filter element and a third color filter element are separated by a second color filter element,
the first color filter element is a green color filter element, the second color filter element is a red color filter element, and the third color filter element is a blue color filter element,
the first color filter element has a first edge portion adjacent to the second color filter element and an opposing edge portion, and the first edge portion of the first color filter element is thicker than the body portion of the first color filter element,
the two edge portions and the body portion of the second color filter element have a same thickness,
the third color filter element has a first edge portion adjacent to the second color filter element and an opposing edge portion, and the first edge portion of the third color filter element is thicker than the body portion of the third color filter element, and
at least one of the first edge portion of the first color filter element and the first edge portion of the third color filter element is thicker than the two edge portions and the body portion of the second color filter element.

2. The color filter plate according to claim 1, wherein: the two edge portions of the first color filter element have a same thickness.

3. The color filter plate according to claim 1, wherein: when the thickness of the at least one edge portion of the first color filter element is determined as approximately 1 µm or 1.5 µm larger than the thickness of the body portion of the first color filter element, the thickness of the body portion of the first color filter element is approximately 1.7 µm-2.7 µm, and the thickness of the at least one edge portion of the first color filter element is approximately 2.7 µm-3.7 µm.

4. The color filter plate according to claim 1, wherein: when in the row direction of the color filter element, the width of the body portion of the first color filter element is determined as approximately twice the width of the at least one edge portion of the first color filter element, the width of the body portion of the first color filter element is approximately 9 µm-10 µm, and the width of the at least one edge portion of the first color filter element is approximately 4.5 µm-5 µm.

5. The color filter plate according to claim 1, further including:
a plurality of second color filter elements and a plurality of third color filter elements, wherein:
the plurality of first color filter elements, the plurality of second color filter elements and the plurality of third color filter elements are alternately arranged in a row direction of the color filter plate,
the first color filter element, a second color filter element and a third color filter element each has a different color, and
color filter elements of a same color are repeatedly arranged in a column direction of the color filter plate.

6. The display device according to claim 1, wherein: in the row direction of the color filter plate, the first part of the black matrix has a width of Wb, the at least one edge portion of the first color filter element has a width of W2, and the at least one edge portion of the first color filter element overlaps the first part of the black matrix by a width of Wb/2, where W2=Wb/2+2 µm.

7. A display device, comprising:
an array substrate including a plurality of pixels arranged in a matrix, wherein a pixel includes a light transmitting region and a light shielding region;
a color film substrate comprising a color filter plate comprising:
a base substrate, a plurality of color filter elements alternately arranged on the base substrate, and a black matrix formed on the substrate and disposed among every two adjacent color filter elements,
wherein:
each color filter element includes two edge portions extending in a column direction of the color filter plate, and one body portion arranged between the two edge portions,
the adjacent edge portions of every two adjacent color filter elements are connected to each other without a gap,
the plurality of color filter elements comprises a plurality of first color filter elements, a plurality of second color filter elements and a plurality of third color filter elements,
at least one edge portion of a first color filter element is thicker than the body portion of the first color filter element,
the black matrix includes a plurality of first parts extending in the column direction of the color filter plate, and a plurality second parts extending in a row direction of the color filter plate,
the body portion of the first color filter element corresponds to a light transmitting region of a pixel, and the at least one edge portion of the first color filter element has a part overlapping a first part of the black matrix and another part overlapping the light transmitting region of the pixel, and the part overlapping the first part of the black matrix has a larger thickness than the body portion of the first color filter element,
according to a light transmittance and a color shift of the color filter plate, in the row direction of the color filter element, a width of the body portion of the first color filter element is determined as approximately twice as the width of the at least one edge portion of the first color filter element, or in a direction perpendicular to the color filter element, a thickness of the at least one edge portion of the first color filter element is determined as approximately 1 µm or 1.5 µm larger than the thickness of the body portion of the first color filter element,
wherein:
the plurality of first color filter elements, the plurality of second color filter elements and the plurality of third color filter elements are alternately arranged on the substrate,
the first color filter element and a third color filter element are separated by a second color filter element,
the first color filter element is a green color filter e ent, the second color filter element is a red color filter element, and the third color filter element is a blue color filter element,
the first color filter element has a first edge portion adjacent to the second color filter element and an opposing edge portion, and the first edge portion of the first color filter element is thicker than the body portion of the first color filter element,
the two edge portions and the body portion of the second color filter element have a same thickness,
the third color filter element has a first edge portion adjacent to the second color filter element and an opposing edge portion, and the first edge portion of the third color filter element is thicker than the body portion of the third color filter element, and
at least one of the first edge portion of the first color filter element and the first edge portion of the third color filter element is thicker than the two edge portions and the body portion of the second color filter element; and
a plurality of spacers disposed between the color film substrate and the array substrate,
wherein the spacers are directly formed on the color filter elements,
portions of the color filter elements arranged beneath the spacers have a uniform thickness,
the spacers are disposed in areas beyond the edge portions of the color filter elements,
the plurality of color filter elements on the color filter plate are one-to-one corresponding to the plurality of pixels on the array substrate, and in the column direction of the color filter plate, a length of the edge portion of a color filter element is smaller than or equal to a length of the light transmitting region of the pixel.

8. The display device according to claim 7, wherein:

the plurality of color filter elements are one-to-one corresponding to the plurality of pixels;

a pixel includes a light shielding region and a light transmitting region;

in the column direction of the color filter element, a length of the at least one edge portion of the first color filter element is smaller than a length of the light shielding region of the pixel.

* * * * *